(12) United States Patent
Fu et al.

(10) Patent No.: US 10,985,001 B2
(45) Date of Patent: Apr. 20, 2021

(54) RAPID ONLINE ANALYZER FOR 14C-AMS

(71) Applicant: Institute of Earth Environment, Chinese Academy of Sciences, Xi'an (CN)

(72) Inventors: Yun-Chong Fu, Xi'an (CN); Hua Du, Xi'an (CN); Peng Cheng, Xi'an (CN); Shugang Wu, Xi'an (CN); Wei-Jian Zhou, Xi'an (CN)

(73) Assignee: INSTITUTE OF EARTH ENVIRONMENT, CHINESE ACADEMY OF SCIENCES, Xi'an (CN)

( * ) Notice: Subject to any disclaimer, the term of this patent is extended or adjusted under 35 U.S.C. 154(b) by 0 days.

(21) Appl. No.: 16/612,813

(22) PCT Filed: Jan. 7, 2019

(86) PCT No.: PCT/CN2019/070595
§ 371 (c)(1),
(2) Date: Nov. 12, 2019

(87) PCT Pub. No.: WO2019/144795
PCT Pub. Date: Aug. 1, 2019

(65) Prior Publication Data
US 2020/0350151 A1 Nov. 5, 2020

(30) Foreign Application Priority Data

Jan. 26, 2018 (CN) .......................... 201810078314.1

(51) Int. Cl.
*H01J 49/04* (2006.01)
*H01J 49/00* (2006.01)
(Continued)

(52) U.S. Cl.
CPC ...... *H01J 49/0459* (2013.01); *H01J 49/0086* (2013.01); *H01J 49/0468* (2013.01);
(Continued)

(58) Field of Classification Search
CPC .... H01J 49/0459; H01J 49/0495; H01J 49/34; H01J 49/0468; H01J 49/14; H01J 49/0086; G01N 1/34; G01N 2030/8868
See application file for complete search history.

(56) References Cited

U.S. PATENT DOCUMENTS 5,012,052 A * 4/1991 Hayes ................ G01N 30/7206
250/282
5,376,355 A * 12/1994 Turteltaub ......... A61K 51/0423
424/1.11
(Continued)

FOREIGN PATENT DOCUMENTS

CN 102053164 A 5/2011
CN 102589936 A 7/2012
(Continued)

*Primary Examiner* — Brooke Purinton

(57) ABSTRACT

A rapid online analyzer for a $^{14}$C-AMS, comprising: a solid sample processing module, an atmospheric sample collection and processing module, a microflow control module, an AMS module and an automatic control module. Sample preparation and AMS measurement are combined, a solid sample is directly converted into $CO_2$ gas by an element analyzer and then enters an AMS for measurement, and an atmospheric sample is collected in real time for analysis by the AMS, such that quick and efficient analysis of the solid sample and the atmospheric sample is realized.

9 Claims, 4 Drawing Sheets

(51) Int. Cl.
*H01J 49/14* (2006.01)
*H01J 49/34* (2006.01)

(52) U.S. Cl.
CPC .......... *H01J 49/0495* (2013.01); *H01J 49/14* (2013.01); *H01J 49/34* (2013.01)

(56) References Cited

U.S. PATENT DOCUMENTS

| | | | | |
|---|---|---|---|---|
| 5,438,194 | A * | 8/1995 | Koudijs | ............... H01J 27/028 250/282 |
| 6,455,844 | B1 * | 9/2002 | Meyer | ................... B01D 59/48 250/281 |
| 6,578,367 | B1 * | 6/2003 | Schaefer | ................ F25D 3/102 62/51.1 |
| 6,707,035 | B2 | 3/2004 | Hughey et al. | |
| 6,867,415 | B2 | 3/2005 | Hughey et al. | |
| 8,448,493 | B2 * | 5/2013 | McIntyre | ........... G01N 30/7206 73/23.37 |
| 9,362,097 | B2 * | 6/2016 | Lozano | ............. B01L 3/502715 |
| 2007/0018091 | A1 * | 1/2007 | Garner | ................ H01J 49/0086 250/283 |
| 2009/0233371 | A1 * | 9/2009 | Tashiro | .................. G01N 31/12 436/59 |
| 2012/0235031 | A1 * | 9/2012 | Turteltaub | ......... H01J 49/0086 250/282 |
| 2012/0241622 | A1 * | 9/2012 | Heyne | ................ G01N 21/3504 250/339.13 |
| 2016/0327461 | A1 * | 11/2016 | Hong | .................. G01N 1/4022 |
| 2019/0154848 | A1 | 5/2019 | Luo et al. | |

FOREIGN PATENT DOCUMENTS

| | | |
|---|---|---|
| CN | 103424462 A | 12/2013 |
| CN | 104007196 A | 8/2014 |
| CN | 203983230 U | 12/2014 |
| CN | 105842035 A | 8/2016 |
| CN | 106226274 A | 6/2018 |
| CN | 207717687 U | 8/2018 |

* cited by examiner

RAPID ONLINE ANALYZER FOR 14C-AMS

TECHNICAL FIELD

The present disclosure relates to a $^{14}C$ analyzer, particularly relates to a rapid online analyzer for $^{14}C$-AMS, and belongs to the field of analytical equipment technology.

BACKGROUND

With the development and promotion of the AMS (accelerator mass spectrometry) technology, long-lived radionuclide $^{14}C$ is widely used in the fields, such as earth science, environmental science, archeology, life science, marine science, and cosmochemistry. At present, there are nearly one hundred AMS laboratories in the world, and almost all of the laboratories still invest more than 90% vigor and machine hours in $^{14}C$ researches. Since the emergence of the AMS, its development and $^{14}C$ application have always promoted each other, and the continuous development of the AMS technology has always driven expansion of the $^{14}C$ application field. Scientists' exploitation of new fields of $^{14}C$ or deep exploitation of the existing fields has further prompted the AMS to have to push forward the former $^{14}C$-AMS analysis technology.

In recent years, the governments of various countries have been faced with security problems such as radionuclide contamination, many environmental problems caused by the social development, and constantly emerging new interdisciplinary problems, all of which have contributed to continuous development of the AMS research direction. Developed countries have planned to implement environmental monitoring based on $^{14}C$-AMS determination and fast monitoring and response of radioactive contaminations, to prevent from possible chemical, biological, radiological and nuclear incidents (CBRN), and provide the basis for making scientific decisions by the governments. With the development of biomedicine, $^{14}C$ is widely used as a tracer agent, and its characteristics of requesting fast and large-scale basic data are reflected clearly. At present, the global warming is closely related to $CO_2$ and other greenhouse gases released from human activities. How much $CO_2$ comes from emissions of fossil fuels is the urgent environmental issues and important scientific issues at present. The emerging monitoring of $\Delta^{14}C$ in the atmosphere will explain the quantity of contribution of fossil fuel carbon emissions to $CO_2$ from another separate perspective, and establish a scientific method for calculating fossil fuel carbon emissions.

The above completely new and unique research field and direction request fast and abundant $^{14}C$ determination data, to provide timely and continuous basic data for researches.

However, the solid target sample sputtering approach used for the conventional $^{14}C$-AMS analysis method has been far from meeting the requirements of fast testing of large-scale samples. Before traditionally testing a $^{14}C$ unknown sample, it is necessary to send the unknown sample to an appropriate chemical pre-treatment and sample preparation laboratory, so that the special chemical laboratory converts C contained therein into $CO_2$, purifies the $CO_2$, and then reduces the $CO_2$ to graphite after a long time (it takes at least 4 hrs to reduce a conventional amount of sample using $H_2$/Fe method, and up to about 12 hrs using Zn/Fe method). Therefore, the period of acquiring $^{14}C$ determination data is very long, and the whole period of a single sample is at least 2 days or more.

In this case, first, it is impossible to meet the research field requesting for fast obtaining analysis results; second, many laboratories cannot meet the requirements for scientific researches requesting for using large-scale samples as the basic data support within limited machine hours; and third, the possibility of sample contamination in a long process will also be greatly increased with the increase of the process duration and the decrease of the sample amount.

Thus, the mode of the conventional chemical treatment approach of samples with the addition of a solid ion source bombarded using a graphite target sample, and then led out for AMS determination has been completely unable to meet the requirements for fast analysis and testing of large-scale or a very trace amount of samples.

At present, the internationally explored and researched gas ion source led out by gas target sample sputtering mainly includes three types as follows:

First, microwave plasma ion source, developed by the Woods Hole Oceanographic Institution. Prepared $CO_2$ is introduced into an ion source through a silicon capillary to produce $C^+$ beam. In order to obtain a negative ion beam for AMS determination, a charge exchange "passage" is provided next to the ion source, and $C^+$ here is converted into $C^-$ beam. For a very small sample size, trace $CO_2$ introduced into the ion source with argon as a carrier. At the charge exchange passage, argon is collected by a beam dump due to occurrence of the charge exchange, while $C^-$ is accelerated and stripped, and then determined in a probe. This approach takes advantage of a positive ion source which is then converted into desired negative ions for AMS determination, needs very complex design, and fails to ensure the final yield of the $C^-$ beam. At the same time, determination of other nuclide using this ion source is constrained. More importantly, the scheme does not achieve fast and simple $^{14}C$ determination scheme. Therefore, the ion source is a device exquisitely reflecting physical theories and ideas, but is not adapted for the actual large-scale and fast $^{14}C$ testing.

Second, the gas ion source introduces $CO_2$ into an ion source head by a self-designed gas loading system. The system is transformed from a solid/gas cesium sputter ion source based on NEC MC-SNICS. $CO_2$ is preburned, and sealed within a Pyrex glass tube with an outer diameter of 6 mm. Then, the glass tube is put in a corrugated tube, and after vacuum degree is reduced, the glass tube filled with $CO_2$ is broken by bending the corrugated tube. $CO_2$ (with helium) is injected into the source ion head through a control valve at a certain speed, to achieve sample determination. The system has provided the basis for solving the Cs sputter ion source for the possibility of gas target sample analysis. However, this approach still separates the original sample treatment from the AMS testing, and does not integrate it to achieve the purpose of fast analysis. However, it initially establishes the theoretical and practical basis for determining $CO_2$ target sample using $Cs^+$ sputter negative ion source.

Third, the gas ion source is designed mainly based on the concept of solid sample processing. $CO_2$ is obtained by combustion through an elemental analyzer, and may be referred to as an EA-AMS ion source. The ion source is transformed on the basis of MC-SNICS produced by NEC and SO-110 solid/gas cesium sputter ion source produced by HVEE. The elemental analyzer achieves obtaining pure $CO_2$ by fast combustion and separation of solid samples, and then $CO_2$ is introduced into an improved ion source target material with helium as the carrier gas. $CO_2$ is converted by a special cesium sputtering target head into $C^-$, which is then led out for AMS determination. Such an ion source is the latest exploration direction in the research and development of gas ion sources at present, and will be likely to solve fast online combustion and AMS testing of a large amount of samples. What is more important is that such an ion source is mainly provided for fast analysis of pure $CO_2$ directly generated from a solid sample by elemental analysis, does not involve direct analysis of atmospheric samples, and thus does not bind to a $CO_2$ purification system, so that now the atmospheric samples requesting fast batch testing cannot be determined through the ion source.

SUMMARY

To solve the defects of the prior art, an object of the present disclosure is to provide a rapid online analyzer for $^{14}C$-AMS that can not only directly analyze solid samples online, and but also directly analyze atmospheric samples online.

In order to achieve the above object, the present disclosure adopts the following technical solution:

A rapid online analyzer for $^{14}C$-AMS includes:

a solid sample processing module: including an elemental analysis submodule and a $CO_2$ purifying and collecting submodule, where the elemental analysis submodule is configured to convert a solid sample directly into $CO_2$, the $CO_2$ purifying and collecting submodule is configured to purify and collect $CO_2$, and the solid sample is converted into $CO_2$ via the elemental analysis submodule and then directly enters the $CO_2$ purifying and collecting submodule;

an atmospheric sample collecting and processing module: comprising an atmospheric sample collecting submodule and a $CO_2$ purifying and storing submodule, where the atmospheric sample collecting submodule is configured to collect atmospheric samples at different heights in real time, the $CO_2$ purifying and storing submodule is configured to purify and store $CO_2$, and the atmospheric samples are collected via the atmospheric sample collecting submodule and then directly enter the $CO_2$ purifying and storing submodule;

a microflow control module: configured to perform microflow control of $CO_2$ from the solid sample processing module and the atmospheric sample collecting and processing module, to keep a flow rate of $CO_2$ at 10 μl/min or less;

an AMS module: configured to lead out $CO_2 \rightarrow C^-$ beam under Cs sputtering of $CO_2$ from the microflow control module, and directly perform $^{14}C$-AMS determination of a gas sample; and an automatic control module: configured to control working processes of the solid sample processing module, the atmospheric sample collecting and processing module, and the microflow control module, and run in linkage with the AMS module.

In the rapid online analyzer for $^{14}C$-AMS, the elemental analysis submodule uses an elemental analyzer.

In the rapid online analyzer for $^{14}C$-AMS, the $CO_2$ purifying and collecting submodule includes: a 6-position selector valve, a $CO_2$ molecular sieve, a pressure gauge, a pump, a quantitative cold trap, and some solenoid valves, where valve ports of the 6-position selector valve are connected in pairs, where $1^\#$ valve port is connected to the elemental analysis submodule, $2^\#$ valve port is connected to an impurity gas outlet pipe, $3^\#$ valve port is connected to an inlet end of the $CO_2$ molecular sieve, $4^\#$ valve port is connected to an inlet end of the quantitative cold trap, $5^\#$ valve port is connected to a He carrier gas pipe, and $6^\#$ valve port is connected to an outlet end of the $CO_2$ molecular sieve;

the $CO_2$ molecular sieve is configured to control $CO_2$ desorption by a precise temperature-controlled electric furnace;

the pressure gauge and the pump are each provided on an installation pipeline of the quantitative cold trap; and the solenoid valves are provided at appropriate positions of the installation pipelines, and are controlled by the automatic control module.

In the rapid online analyzer for $^{14}C$-AMS, a front-end pipeline of the $CO_2$ molecular sieve is filled with desiccant.

In the rapid online analyzer for $^{14}C$-AMS, the atmospheric sample collecting submodule includes: a plurality of gas inlet pipes, air filters, solenoid valves, and gas outlet pipes, where the plurality of gas inlet pipes are configured to collect atmospheric samples respectively from different heights, the air filters are each installed at a gas inlet end of each of the gas inlet pipes, all gas outlet ends of the gas inlet pipes are connected to the solenoid valves, the atmospheric samples in the gas inlet pipes enter the gas outlet pipes after switching gas inlet passages via the solenoid valves, and the gas outlet pipes are connected to the $CO_2$ purifying and storing submodule.

In the rapid online analyzer for $^{14}C$-AMS, the $CO_2$ purifying and storing submodule includes: a sample inlet line, a primary purifying cold trap, a secondary purifying cold trap, a cold trap for storage, a first manifold for determining volume, a second manifold for determining volume, a sample outlet line, a vacuum pump, some high vacuum valves, and a vacuum gauge/pressure sensor, where the sample inlet line, the primary purifying cold trap, the secondary purifying cold trap, the first manifold for determining volume, the cold trap for storage, the second manifold for determining volume, and the sample outlet line are connected in series successively, the vacuum pump vacuumizes the three cold traps through the three lines, and the high vacuum valve and the vacuum gauge/pressure sensor are mounted at appropriate positions of the whole submodule.

In the rapid online analyzer for $^{14}C$-AMS, the $CO_2$ purifying and storing submodule further includes: a standby unpurified atmospheric sample inlet line. The standby unpurified atmospheric sample inlet line is connected to a sample inlet line.

In the rapid online analyzer for $^{14}C$-AMS, the $CO_2$ purifying and storing submodule further includes: a standby purified $CO_2$ sample inlet line. The standby purified $CO_2$ sample inlet line is connected to a pipeline connecting the secondary purifying cold trap and the first manifold for determining volume.

In the rapid online analyzer for $^{14}C$-AMS, the microflow control module includes: a 4-position selector valve, a 6-position selector valve, and a precise temperature-controlled cold trap, where the 4-position selector valve has $1^\#$ valve port of connected to an outlet of the $CO_2$ purifying and collecting submodule, $2^\#$ valve port connected to a sample outlet line of the $CO_2$ purifying and storing submodule, $3^\#$ valve port and $4^\#$ valve port both being standby valve ports, and an outlet connected to the 6-position selector valve; and valve ports of the 6-position selector valve are connected in pairs, where the $1^\#$ valve port is connected to the outlet of the 4-position selector valve, the $2^\#$ valve port is connected to the impurity gas outlet pipe, the $3^\#$ valve port is connected to one end of the precise temperature-controlled cold trap, the $4^\#$ valve port is connected to an ion source of the AMS module, the $5^\#$ valve port is connected to the He carrier gas pipe, and the 6# valve port is connected to other end of the precise temperature-controlled cold trap.

The benefits of the present disclosure include: the rapid online analyzer for $^{14}$C-AMS of the present disclosure directly links $^{14}$C technology for direct analysis of $CO_2$ samples with AMS based on direct sputtering analysis technology of $CO_2$, integrates sample preparation and AMS determination, can not only quickly and efficiently analyze $^{14}$C samples (including solid samples and atmospheric samples), and reduce the possibility of sample contamination, but also significantly improve $^{14}$C sample analysis and testing capabilities of an AMS laboratory within limited machine hours, and can also provide another faster scheme with stronger anti-pollution capacity for determination of a very trace amount of samples (content: a few μg). The original solid sample is converted directly into $CO_2$ for AMS determination without special processing in a chemical laboratory, and the atmospheric samples can be collected in real time for AMS analysis, thereby completely changing the process of sample preparation before $^{14}$C-AMS determination in a former special chemical laboratory.

Figure 1:
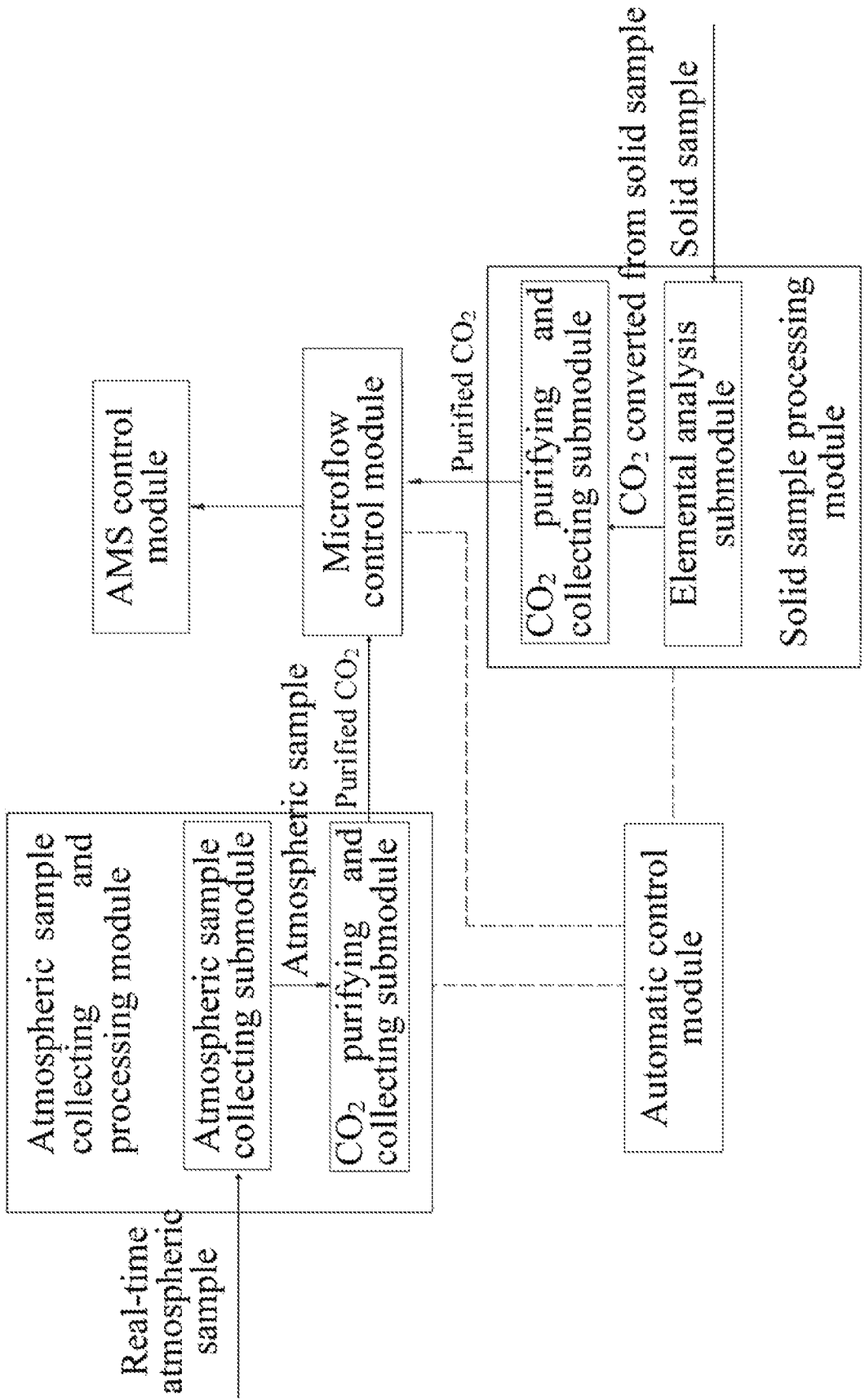
FIG. 1 is a schematic structural diagram of a rapid online analyzer for $^{14}$C-AMS.

Meanings of reference numerals in the figures: 11—6-position selector valve, 12—$CO_2$ molecular sieve, 13—pressure gauge, 14—pump, 15—quantitative cold trap, 16—solenoid valve, 17—solenoid valve, 18—solenoid valve, 19—solenoid valve, 20—solenoid valve, 21—4-position selector valve, 22—6-position selector valve, 23—precise temperature-controlled cold trap, 24—gas inlet pipe, 25—air filter, 26—solenoid valve, 27—gas outlet pipe, 28—sample inlet line, 29—primary purifying cold trap, 30—secondary purifying cold trap, 31—cold trap for storage, 32—first manifold for determining volume, 33—second manifold for determining volume, 34—sample outlet line, 35—vacuum pump, 36—standby unpurified atmospheric sample inlet line, and 37—standby purified $CO_2$ sample inlet line.

DESCRIPTION OF THE EMBODIMENTS

The rapid online analyzer for $^{14}$C-AMS of the present disclosure is a comprehensive $^{14}$C-AMS fast analysis system using a working mode based on a gas ion source, can achieve online processing of gas samples and solid samples, and thus can achieve fast AMS testing and analysis. It is designed based on the "modular, fast, automated, general purpose, and open" basic design idea, and its modules have relatively independent functions.

The present disclosure is specifically introduced below in conjunction with the accompanying drawings and the specific embodiments.

Referring to FIG. 1, the present disclosure discloses a rapid online analyzer for $^{14}$C-AMS, including: a solid sample processing module, an atmospheric sample collecting and processing module, a microflow control module, an AMS module, and an automatic control module.

I. Solid Sample Processing Module

The solid sample processing module is configured to process solid samples to obtain purified $CO_2$.

The solid sample processing module includes an elemental analysis submodule and a $CO_2$ purifying and collecting submodule.

1. Elemental Analysis Submodule

The elemental analysis submodule is configured to directly burn solid samples, to convert the solid samples into $CO_2$.

In the present disclosure, the elemental analysis submodule uses an elemental analyzer.

An exhaust outlet of the existing elemental analyzer is generally a pipe of 6 mm. The exhaust outlet is modified slightly by first adapting to connect the pipe of 6 mm to a copper pipe of ⅛ inch, and then adapting to connect the copper pipe of ⅛ inch to a stainless steel pipe of ¼ inch, so as to facilitate connecting to the $CO_2$ purifying and collecting submodule, i.e., contribute $CO_2$ to enter a followed $CO_2$ purifying and collecting submodule.

When the elemental analyzer is used, first a solid sample is pulverized to a powder. Then, the powder is wrapped in aluminum foil, and its mass is weighed accurately. Then, the sample is directly fed into a combustion tube at 950° C. from a sample inlet plate, to obtain $CO_2$ through complete combustion by introducing $O_2$ into the combustion tube and supplementing with CuO. Then, the gas obtained from complete combustion enters a reducing tube filled with Cu powder to obtain $N_2$ by reducing with NO or $NO_2$. $N_2$, $CO_2$. Some impurity gases are carried by a carrier gas He to enter a $CO_2$ adsorption column, then successively enter a TCD detector after desorption for different durations, and finally outputted from the exhaust outlet successively, where $N_2$, impurity gases, and the carrier gas before a $CO_2$ peak are discharged from a vacuum system, while $CO_2$ is introduced into the followed $CO_2$ purifying and collecting submodule. The process is switched by a multiposition selector valve.

In practical operation, the $CO_2$ desorption duration is adjusted by specifically adjusting to a delay of 30 seconds after appearance of $N_2$.

The solid sample is converted via the elemental analysis submodule into $CO_2$ which then directly enters the $CO_2$ purifying and collecting submodule.

2. $CO_2$ Purifying and Collecting Submodule

The $CO_2$ purifying and collecting submodule is configured to purify and collect $CO_2$ generated by the elemental analysis submodule.

Figure 2:
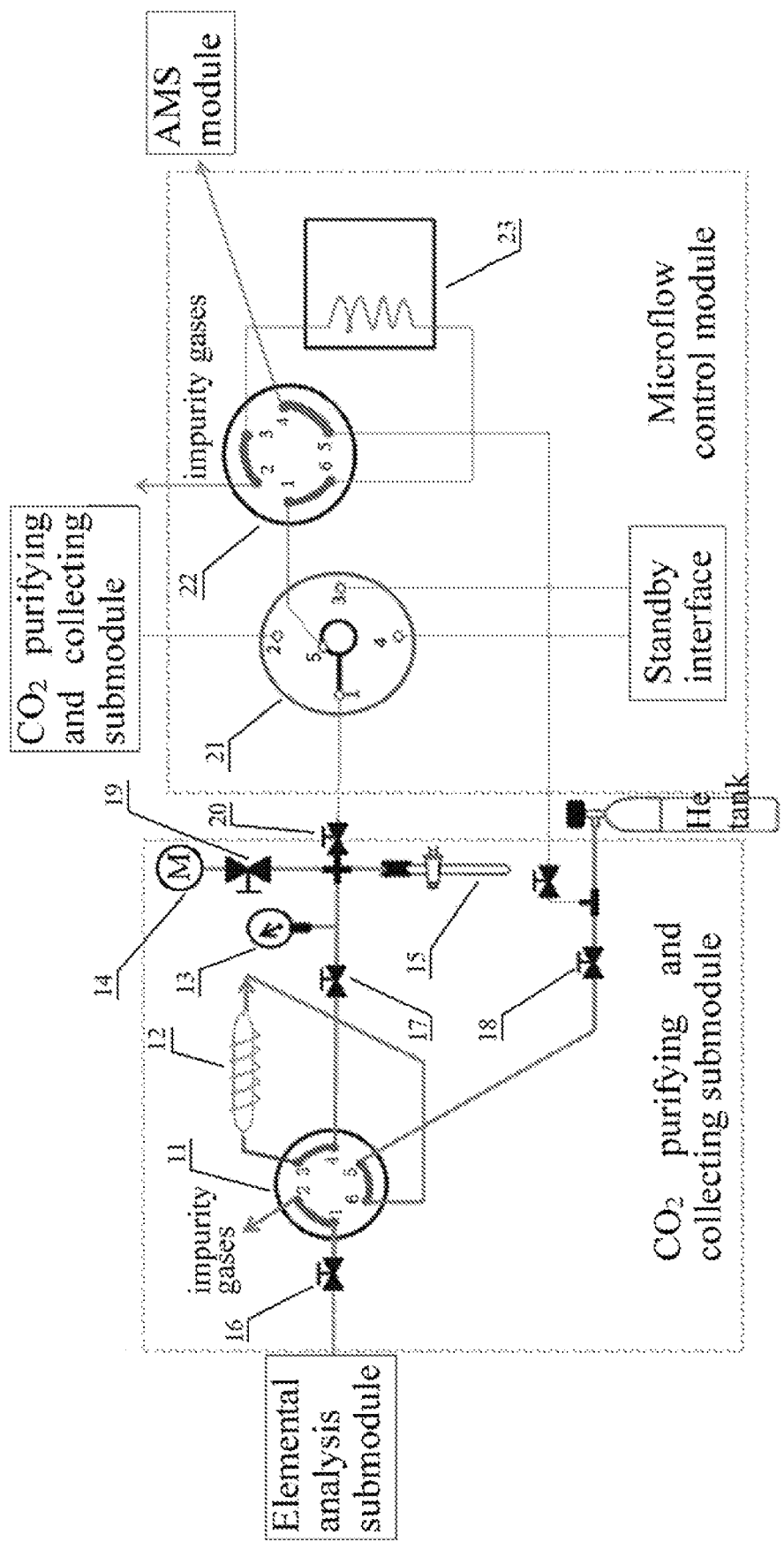
FIG. 2 is a schematic structural diagram of a $CO_2$ purifying and collecting submodule and a microflow control module in FIG. 1.

Referring to FIG. 2, the $CO_2$ purifying and collecting submodule includes: a 6-position selector valve 11, a $CO_2$ molecular sieve 12, a pressure gauge 13, a pump 14, a quantitative cold trap 15, and some solenoid valves.

(1) 6-Position Selector Valve

Referring to FIG. 2, valve ports of the 6-position selector valve 11 are connected in pairs, where 1# valve port is connected to the elemental analysis submodule, 2# valve port is connected to an impurity gas outlet pipe, 3# valve port is connected to an inlet end of the $CO_2$ molecular sieve 12, 4# valve port is connected to an inlet end of the quantitative cold trap 14, 5# valve port is connected to a He carrier gas pipe, and 6# valve port is connected to an outlet end of the $CO_2$ molecular sieve 12.

A solenoid valve 16 is provided on a pipeline connecting the 1# valve port and the elemental analysis submodule.

A solenoid valve 17 is provided on a pipeline connecting the 4# valve port and the quantitative cold trap 15, and a solenoid valve 20 is provided on an outlet pipe of the quantitative cold trap 15.

A solenoid valve 18 is provided on a pipeline connecting the 5# valve port and the He carrier gas pipe.

The solenoid valve 16, the solenoid valve 17, the solenoid valve 18, and the solenoid valve 20 are all controlled by the automatic control module.

(2) $CO_2$ Molecular Sieve

The $CO_2$ molecular sieve 12 is configured to adsorb and store $CO_2$, and release $CO_2$. Its desorption of $CO_2$ is controlled by a precise temperature-controlled electric furnace. When it is necessary to release $CO_2$, the precise temperature-controlled electric furnace is used for desorption, and the desorbed $CO_2$ enters the quantitative cold trap.

As a preferred solution, a front-end pipeline of the $CO_2$ molecular sieve 12 is filled with desiccant for drying moisture.

(3) Pressure Gauge, and Pump

The pressure gauge 13 and the pump 14 are both provided on an installation pipeline of the quantitative cold trap 15, where the pressure gauge 13 is located after the solenoid valve 17, the pump 14 is located after the pressure gauge 13, and a solenoid valve 19 is provided on an installation pipeline of the pump 14.

The solenoid valve 19 is also controlled by the automatic control module.

(4) Quantitative Cold Trap

The quantitative cold trap 15 is configured to repurify $CO_2$, temporarily store $CO_2$, and determine $CO_2$ volume, and is provided with a pressometer.

Working principle of the $CO_2$ purifying and collecting submodule:

After automated processing of the solid sample by the elemental analysis submodule, the impurity gases ($N_2$ and the carrier gas) and to-be-tested gases ($CO_2$ and the carrier gas) are unsimultaneously introduced into the 6-position selector valve 11. The valve ports of the 6-position selector valve 11 are connected in pairs:

When the 1# valve port is connected to the 2# valve port (cf FIG. 2), the impurity gases are discharged, the to-be-tested gases have been stored in the $CO_2$ molecular sieve 12, and $CO_2$ is released after heating the $CO_2$ molecular sieve 12. At the same time, the He carrier gas in a He tank is introduced into the $CO_2$ purifying and collecting submodule via the 5# valve port. $CO_2$ that is released because of being carried by the He carrier gas enters a followed quantitative cold trap 15 via the 4# valve port, and the quantitative cold trap 15 can be configured to determine the $CO_2$ volume by switching off all valves.

When switching to the 1# valve port being connected to the 6# valve port, the 2# valve port being connected to the 3# valve port, and the 4# valve port being connected to the 5# valve port, it enters a mode of adsorbing the to-be-tested gases. In this case, $CO_2$ led out by the elemental analysis submodule is introduced into the $CO_2$ purifying and collecting submodule via the 1# valve port, and the He carrier gas and $CO_2$ simultaneously enter the $CO_2$ molecular sieve 12 via the 6# valve port, where $CO_2$ is adsorbed, while the He carrier gas is discharged via the 2# valve port.

Appearance and termination of a $N_2$ peak of a sample processed by the elemental analysis submodule are used as controlled switching points of the 6-position selector valve 11.

$CO_2$ is purified by the $CO_2$ purifying and collecting submodule, and then collected in the quantitative cold trap 15. When $CO_2$ needs to be determined, $CO_2$ collected in the quantitatively cold trap 15 directly enters the microflow control module.

II. Atmospheric Sample Collecting and Processing Module

The atmospheric sample collecting and processing module is configured to collect and online process real-time atmospheric samples to obtain purified $CO_2$.

The atmospheric sample collecting and processing module includes an atmospheric sample collecting submodule and a $CO_2$ purifying and storing submodule.

1. Atmospheric Sample Collecting Submodule

The atmospheric sample collecting submodule is configured to collect atmospheric samples at different heights in real time.

Figure 3:
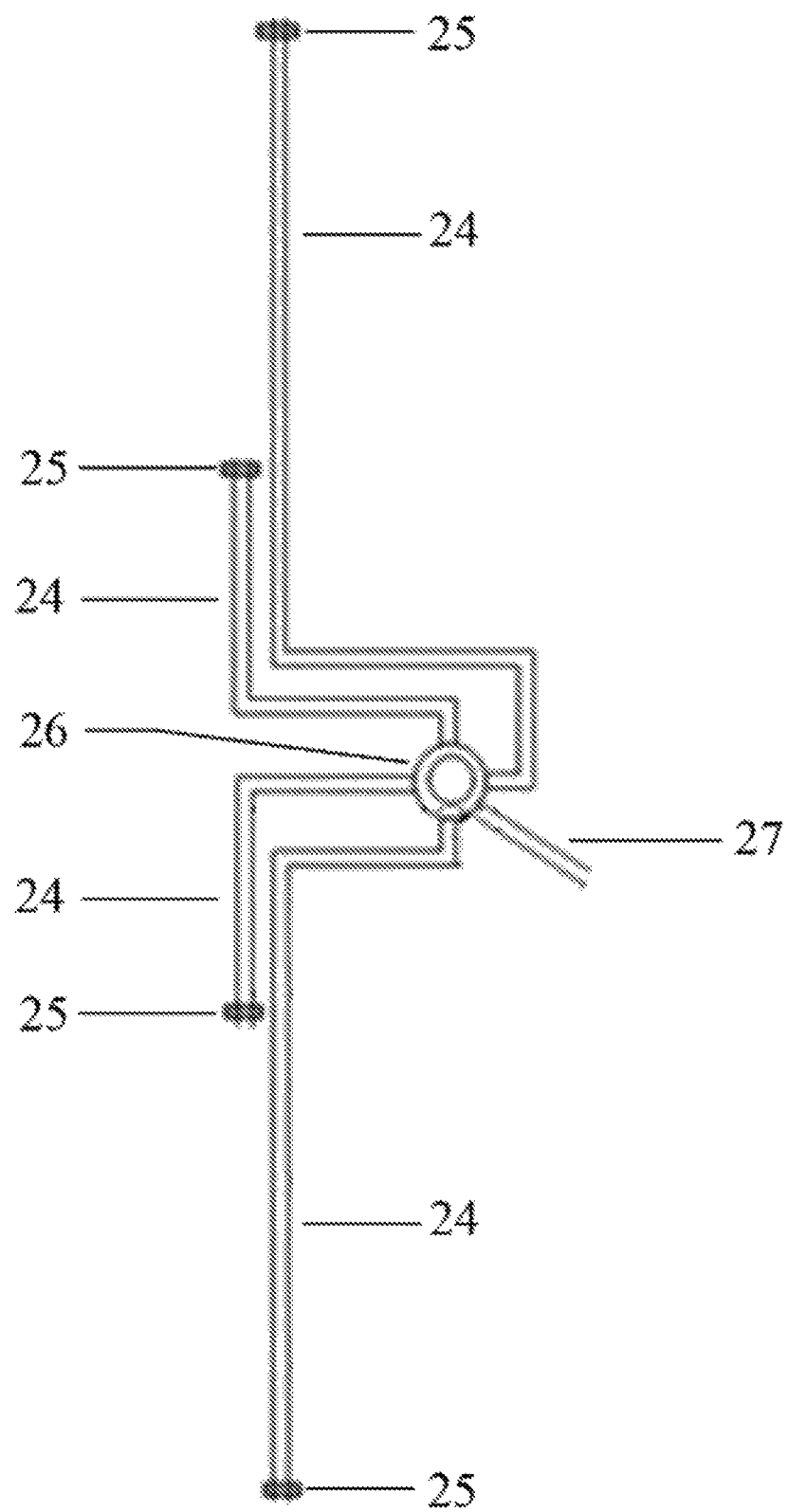
FIG. 3 is a schematic structural diagram of an atmospheric sample collecting submodule in FIG. 1.

Referring to FIG. 3, the atmospheric sample collecting submodule includes: a plurality of gas inlet pipes 24, air filters 25, solenoid valves 26, and gas outlet pipes 27.

The plurality of (e.g., four) gas inlet pipes 24 are configured to collect atmospheric samples respectively from different heights (e.g., heights of gas inlets from the ground are 2 m, 15 m, 25 m, and 35 m respectively), the air filters 25 are each installed at a gas inlet end of each of the gas inlet pipes 24, all gas outlet ends of the gas inlet pipes 24 are connected to the solenoid valves 26, and the atmospheric samples in the gas inlet pipes 24 enter the gas outlet pipes 27 after switching gas inlet passages via the solenoid valves 26.

The specification of both the gas inlet pipe 24 and the gas outlet pipe 27 may be: an outer diameter of 6 mm, and an inner diameter of 4 mm.

As a preferred scheme, the gas inlet pipe 24 and the gas outlet pipe 27 are both made from polytetrafluoroethylene.

The atmospheric samples are collected by the atmospheric sample collecting submodule, and then directly enter the $CO_2$ purifying and storing submodule.

2. $CO_2$ Purifying and Storing Submodule

The $CO_2$ purifying and storing submodule is configured to purify and store $CO_2$ collected by the atmospheric sample collecting submodule.

Figure 4:
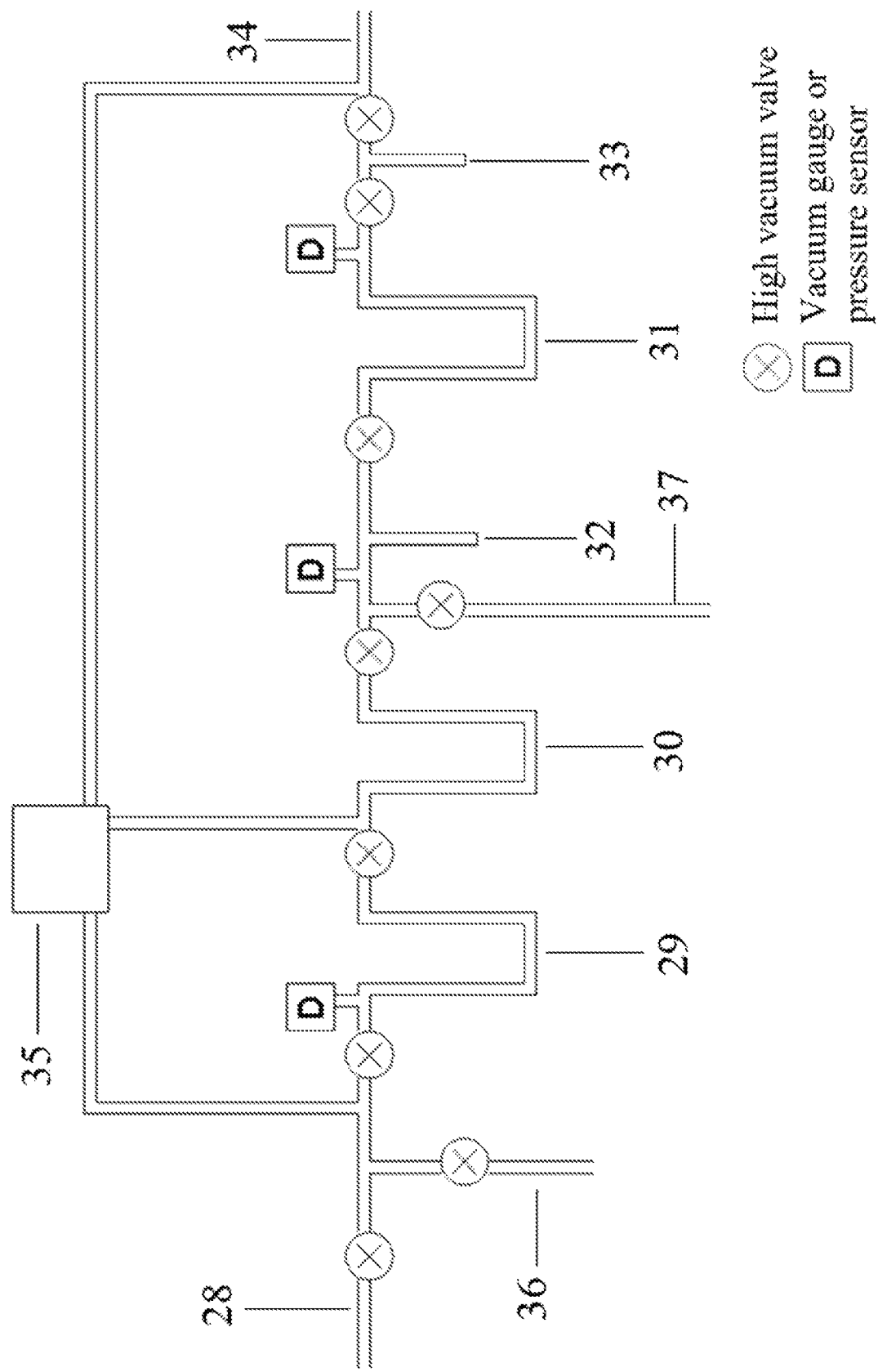
FIG. 4 is a schematic structural diagram of a $CO_2$ purifying and storing submodule in FIG. 1.

Referring to FIG. 4, the $CO_2$ purifying and storing submodule includes: a sample inlet line 28, two-stage purifying cold traps (a primary purifying cold trap 29, and a secondary purifying cold trap 30), a cold trap 31 for storage, two manifolds for determining volume (a first manifold 32 for determining volume, and a second manifold 33 for determining volume), a sample outlet line 34, a vacuum pump 35, some high vacuum valves, and a vacuum gauge/pressure sensor.

The sample inlet line 28, the primary purifying cold trap 29 (configured to remove gases except for $CO_2$ ad moisture), the secondary purifying cold trap 30 (configured to transfer $CO_2$, thus discharging moisture), the first manifold 32 for determining volume, the cold trap 31 for storage (configured to store $CO_2$), the second manifold 33 for determining volume, and the sample outlet line 34 are connected in series successively, the vacuum pump 35 vacuumizes the three cold traps through the three lines, and the high vacuum valve and the vacuum gauge/pressure sensor are mounted at appropriate positions of the whole submodule.

As a preferred scheme, the $CO_2$ purifying and storing submodule further includes: a standby unpurified atmospheric sample inlet line 36. The standby unpurified atmospheric sample inlet line 36 is connected to the sample inlet line 28, is configured to introduce gas samples collected outdoors, and is provided with the high vacuum valve.

More preferably, the $CO_2$ purifying and storing submodule further includes: a standby purified $CO_2$ sample inlet line 37. The standby purified $CO_2$ sample inlet line 37 is connected to a pipeline connecting the secondary purifying cold trap 30 and the first manifold 32 for determining volume, is configured to introduce purified gas samples, and is also provided with the high vacuum valve.

The $CO_2$ purifying and storing submodule also has the sample inlet line 28, the standby unpurified atmospheric sample inlet line 36, and the standby purified $CO_2$ sample inlet line 37, thereby achieving introducing atmospheric samples by various approaches, and greatly facilitating use.

$CO_2$ purified by the $CO_2$ purifying and collecting submodule is stored in the cold trap for storage. When $CO_2$ needs to be determined, $CO_2$ stored in the cold trap for storage directly enters the microflow control module.

III. Microflow Control Module

The microflow control module is configured to perform microflow control of $CO_2$ from the solid sample processing module and the atmospheric sample collecting and processing module, to keep a flow rate of $CO_2$ at 10 μl/min or less, and contribute to $^{14}$C-AMS determination by the AMS module.

Referring to FIG. 2, the microflow control module includes: a 4-position selector valve 21, a 6-position selector valve 22, and a precise temperature-controlled cold trap 23.

1. 4-Position Selector Valve

In the 4-position selector valve 21, $1^{\#}$ valve port is connected to an outlet of the $CO_2$ purifying and collecting submodule, $2^{\#}$ valve port is connected to a sample outlet line of the $CO_2$ purifying and storing submodule, $3^{\#}$ valve port and $4^{\#}$ valve port are both standby valve ports, and $5^{\#}$ valve port (an outlet) is connected to the 6-position selector valve.

Working mode of the 4-position selector valve 21: Switching between the $1^{\#}$ valve port, the $2^{\#}$ valve port, the $3^{\#}$ valve port, and the $4^{\#}$ valve port, and the $5^{\#}$ valve port (the outlet) is always connected to $1^{\#}$ valve port of the 6-position selector valve 22.

2. 6-Position Selector Valve

Valve ports of the 6-position selector valve 22 are connected in pairs, where the $1^{\#}$ valve port is connected to the outlet of the 4-position selector valve 21, $2^{\#}$ valve port is connected to the impurity gas outlet pipe, $3^{\#}$ valve port is connected to one end of the precise temperature-controlled cold trap 23, $4^{\#}$ valve port is connected to an ion source of the AMS module, $5^{\#}$ valve port is connected to the He carrier gas pipe, and $6^{\#}$ valve port is connected to other end of the precise temperature-controlled cold trap 23.

3. Precise Temperature-Controlled Cold Trap

The precise temperature-controlled cold trap is configured to control gas temperature.

Temperature control precision of the precise temperature-controlled cold trap is 1° C. at a temperature below −150° C., 0.5° C. at a temperature of −150° C. to −70° C., and 0.2° C. at a temperature of −70° C. to 200° C.

Working Principle of the Microflow Control Module:

In the 6-position selector valve 22, when the $1^{\#}$ valve port is connected to the $6^{\#}$ valve port, the $2^{\#}$ valve port is connected to the $3^{\#}$ valve port, and the $4^{\#}$ valve port is connected to the $5^{\#}$ valve port (as shown in FIG. 2), the 4-position selector valve 21 introduces a gas, which enters the precise temperature-controlled cold trap 23, and is first stored. The impurity gases are discharged by the $3^{\#}$ valve port of the 6-position selector valve 22 via the $2^{\#}$ valve port, and the $4^{\#}$ valve port and the $5^{\#}$ valve port are switched off to keep a consistent vacuum degree between the segment and the ion source of the AMS module.

After $CO_2$ is stored in the precise temperature-controlled cold trap 23, the 6-position selector valve 22 is switched to another conduction mode, i.e., the $1^{\#}$ valve port is connected to the $2^{\#}$ valve port, the $3^{\#}$ valve port is connected to the $4^{\#}$ valve port, and the $5^{\#}$ valve port is connected to the $6^{\#}$ valve port. In this case, no to-be-tested gas is in the 4-position selector valve 21, and other impurity gases are discharged directly from the $2^{\#}$ valve port of the 6-position selector valve 22. The precise temperature-controlled cold trap 23 precisely controls the temperature, selects an appropriate saturated vapor pressure of $CO_2$, and very slowly releases $CO_2$ to keep a flow rate of $CO_2$ at 10 μl/min or less, whilst controlling the He carrier gas to enter the microflow control module via the $5^{\#}$ valve port of the 6-position selector valve 22, and connecting to the $6^{\#}$ valve port. The He carrier gas carries $CO_2$ in the precise temperature-controlled cold trap 23 to be led out from the $3^{\#}$ valve port of the 6-position selector valve 22, and enters the ion source of the AMS module through the $4^{\#}$ valve port.

IV. AMS Module

The AMS module is configured to lead out $CO_2 \rightarrow C^-$ beam under Cs sputtering of $CO_2$ from the microflow control module, and directly perform $^{14}$C-AMS determination of a gas sample.

As a preferred solution, the AMS module uses Xi'an-AMS.

V. Automatic Control Module

The automatic control module is configured to control working processes of the solid sample processing module, the atmospheric sample collecting and processing module, and the microflow control module, and run in linkage with the AMS module.

Thus it can be seen that, the rapid online analyzer for $^{14}$C-AMS of the present disclosure has the following characteristics and advantages:

1. Fast and Integrated Sample Analysis and Testing

The fastness of the rapid online analyzer for $^{14}$C-AMS of the present disclosure is mainly reflected in the integration of sample preparation and AMS determination, i.e., avoiding a most time-consuming process of reducing $CO_2$ to graphite in conventional methods, thereby greatly reducing the analysis duration, improving the efficiency, and reducing the possibility of sample contamination.

Linkage of submodules of the rapid online analyzer for $^{14}$C-AMS of the present disclosure is particularly critical to achieve standardization, simple linkage, and on-off control of physical interfaces/outlets the submodules.

2. Automated Control

The rapid online analyzer for $^{14}$C-AMS of the present disclosure basically achieves automated control, completely changes the approach of manually controlling gas passages in traditional modes, achieves automated control of small widgets (e.g., pump package, valve set, or cold trap temperature control), and can directly acquire real-time various state parameters to know about the experiment progress.

3. General Purpose Interfaces

General purpose interfaces of the rapid online analyzer for $^{14}$C-AMS of the present disclosure are not only reflected in standardization of physical interfaces/outlets of the submodules (embodied in use of prevailing standards and data interfaces in selection and control of control components), but also reflected in standardizing and unifying connection points of the submodules to standard interfaces of existing conventional methods, thus facilitating unified maintenance and sample introduction in the future.

4. High Openness and Compatibility

The above design ideas and characteristics of the rapid online analyzer for $^{14}$C-AMS of the present disclosure ensure its openness and compatibility. Its complete and standard interfaces (including physical interfaces and control interfaces) and control modes lay the foundation for reexpansion and redevelopment of the rapid online analyzer for $^{14}$C-AMS in the future. In the future, a fast sample analysis submodule in other forms can be additionally provided for $^{14}$C-AMS analysis only by inserting the fast analysis submodule into the rapid online analyzer for $^{14}$C-AMS. Moreover, a corresponding submodule may also be developed for other long-lived nuclides in gaseous form for real-time AMS determination only by embedding the corresponding submodule into the rapid online analyzer for $^{14}$C-AMS.

5. Miscellaneous

It integrates chemical pre-treatment and AMS testing of samples, greatly reduces the data acquisition process, improves the working efficiency, and reduces the possibility of sample contamination.

It should be noted that, the above embodiments do not limit the present disclosure in any form, and all technical solutions obtained from equivalent substitutions or equivalent transformations fall within the scope of protection of the present disclosure.

What is claimed is:

1. A rapid online analyzer for $^{14}$C-AMS (accelerator mass spectrometry), comprising:
    a solid sample processing module: comprising an elemental analysis submodule and a $CO_2$ purifying and collecting submodule, wherein the elemental analysis submodule is configured to convert a solid sample directly into $CO_2$, the $CO_2$ purifying and collecting submodule is configured to purify and collect $CO_2$, and the solid sample is converted into $CO_2$, via the elemental analysis submodule and then directly enters the $CO_2$ purifying and collecting submodule;
    an atmospheric sample collecting and processing module: comprising an atmospheric sample collecting submodule and a $CO_2$ purifying and storing submodule, wherein the atmospheric sample collecting submodule is configured to collect atmospheric samples at different heights in real time, the $CO_2$ purifying and storing submodule is configured to purify and store $CO_2$, and the atmospheric samples are collected via the atmospheric sample collecting submodule and then directly enter the $CO_2$ purifying and storing submodule;
    a microflow control module: configured to perform microflow control of $CO_2$, from the solid sample processing module and the atmospheric sample collecting and processing module, to keep a flow rate of $CO_2$ at 10 μl/min or less;
    an AMS module: configured to lead out $CO_2 \rightarrow C^-$ beam under Cs sputtering of $CO_2$ from the microflow control module, and directly perform $^{14}$C-AMS determination of a gas sample; and
    an automatic control module: configured to control working processes of the solid sample processing module, the atmospheric sample collecting and processing module, and the microflow control module, and run in linkage with the AMS module.

2. The rapid online analyzer for $^{14}$C-AMS according to claim 1, wherein the elemental analysis submodule uses an elemental analyzer.

3. The rapid online analyzer for $^{14}$C-AMS according to claim 1, wherein the $CO_2$ purifying and collecting submodule comprises: a 6-position selector valve, a $CO_2$ molecular sieve, a pressure gauge, a pump, a quantitative cold trap, and some solenoid valves, wherein
    valve ports of the 6-position selector valve are connected in pairs, wherein $1^\#$ valve port is connected to the elemental analysis submodule, $2^\#$ valve port is connected to an impurity gas outlet pipe, $3^\#$ valve port is connected to an inlet end of the $CO_2$ molecular sieve, $4^\#$ valve port is connected to an inlet end of the quantitative cold trap, $5^\#$ valve port is connected to a He carrier gas pipe, and $6^\#$ valve port is connected to an outlet end of the $CO_2$ molecular sieve;
    the $CO_2$ molecular sieve is configured to control $CO_2$ desorption by a precise temperature-controlled electric furnace;
    the pressure gauge and the pump are each provided on an installation pipeline of the quantitative cold trap; and
    the solenoid valves are provided at appropriate positions of the installation pipelines, and are controlled by the automatic control module.

4. The rapid online analyzer for $^{14}$C-AMS according to claim 3, wherein a front-end pipeline of the $CO_2$ molecular sieve is filled with desiccant.

5. The rapid online analyzer for $^{14}$C-AMS according to claim 1, wherein the atmospheric sample collecting submodule comprises: gas inlet pipes, air filters, solenoid valves, and gas outlet pipes, wherein
    a plurality of gas inlet pipes are configured to collect atmospheric samples respectively from different heights, the air filters are each installed at a gas inlet end of each of the gas inlet pipes, all gas outlet ends of the gas inlet pipes are connected to the solenoid valves, the atmospheric samples in the gas inlet pipes enter the gas outlet pipes after switching gas inlet passages via the solenoid valves, and the gas outlet pipes are connected with the $CO_2$ purifying and storing submodule.

6. The rapid online analyzer for $^{14}$C-AMS according to claim 5, wherein the $CO_2$ purifying and storing submodule comprises: a sample inlet line, two-stage purifying cold traps (a primary purifying cold trap, and a secondary purifying cold trap), a cold trap for storage, a first manifold for determining volume, a second manifold for determining volume, a sample outlet line, a vacuum pump, and some high vacuum valves, wherein
    the sample inlet line, the primary purifying cold trap, the secondary purifying cold trap, the first manifold for determining volume, the cold trap for storage, the second manifold for determining volume, and the sample outlet line are connected in series successively, the vacuum pump vacuumizes the three cold traps through the three lines.

7. The rapid online analyzer for $^{14}$C-AMS according to claim 6, wherein the $CO_2$ purifying and storing submodule further comprises: a standby unpurified atmospheric sample inlet line, the standby unpurified atmospheric sample inlet line connected to a sample inlet line.

8. The rapid online analyzer for $^{14}$C-AMS according to claim 6, wherein the $CO_2$ purifying and storing submodule further comprises: a standby purified $CO_2$ sample inlet line, the standby purified $CO_2$ sample inlet line 20 connected to a pipeline connecting the secondary purifying cold trap and the first manifold for determining volume.

9. The rapid online analyzer for $^{14}$C-AMS according to claim 1, wherein the microflow control module comprises: a 4-position selector valve, a 6-position selector valve, and a precise temperature-controlled cold trap, wherein
    the 4-position selector valve has $1^\#$ valve port connected to an outlet of the $CO_2$ purifying and collecting submodule, $2^\#$ valve port connected to a sample outlet line of the $CO_2$ purifying and storing submodule, $3^\#$ valve port and $4^\#$ valve port both being standby valve ports, and an outlet connected to the 6-position selector valve; and valve ports of the 6-position selector valve are connected in pairs, wherein the $1^{\#}$ valve port is connected to the outlet of the 4-position selector valve, the $2^{\#}$ valve port is connected to the impurity gas outlet pipe, the $3^{\#}$ valve port is connected to one end of the precise temperature-controlled cold trap, the $4^{\#}$ valve port is connected to an ion source of the AMS module, the $5^{\#}$ valve port is connected to the He carrier gas pipe, and the $6^{\#}$ valve port is connected to other end of the precise temperature-controlled cold trap.

* * * * *